United States Patent [19]

Bandy

[11] 4,422,354

[45] Dec. 27, 1983

[54] ENGINE OVERHEAT PROTECTION SYSTEM FOR DUAL HORSE POWER ENGINE

[75] Inventor: Larry L. Bandy, Springfield, Ill.

[73] Assignee: Fiat Allis North America, Inc., Deerfield, Ill.

[21] Appl. No.: 344,198

[22] Filed: Jan. 29, 1982

[51] Int. Cl.³ ...................... B60K 41/06; F02M 39/00

[52] U.S. Cl. ........................................ 74/860; 74/872; 123/458; 123/464; 123/512

[58] Field of Search ............... 123/446, 457, 458, 464, 123/340, 510, 512

[56] References Cited

U.S. PATENT DOCUMENTS

| | | | |
|---|---|---|---|
| 3,645,366 | 2/1972 | Numazawa et al. | 123/340 X |
| 3,949,714 | 4/1976 | Mitchell | 123/458 X |
| 4,062,328 | 12/1977 | Konno | 123/493 |
| 4,102,316 | 7/1978 | Yalbert | 123/340 X |
| 4,297,978 | 11/1981 | Matsui | 123/340 X |

*Primary Examiner*—William A. Cuchlinski, Jr.

*Attorney, Agent, or Firm*—Robert A. Brown

[57] ABSTRACT

The present invention relates to a control system for use with an internal combustion engine connected to a load through a variable speed transmission. The instant system protects the engine and conserves fuel by automatically reducing the engine horse power when it is appropriate. The system includes a fuel valve connected to a source of fuel for affecting the rate of fuel delivered to the internal combustion engine for determining the power output of the engine. A temperature responsive control is connected to a portion of the internal combustion engine and is connected to the fuel valve to affect the fuel valve for regulating the rate of fuel delivered to the engine when the temperature of coolant in the internal combustion engine reaches a predetermined value. A speed responsive control is connected to a portion of a power train connected to the output of the engine and is connected to the fuel valve in series with the temperature responsive control. The speed responsive control also regulates the fuel valve to control the rate of fuel delivered to the engine when the power train is in a selected attitude thereby, allowing the maximum amount of power output from the engine only when the temperature of the coolant is in a selected range and the transmission is in a selected attitude.

11 Claims, 3 Drawing Figures

ENGINE OVERHEAT PROTECTION SYSTEM FOR DUAL HORSE POWER ENGINE

BACKGROUND OF THE INVENTION

The present invention is directed to a control system for use with an internal combustion engine connected to a load through a variable speed transmission. In the utilization of an internal combustion engine and in particular a diesel engine in off-the-road equipment, it is found that ordinarily the operators of these engines operate the engine at the maximum horsepower of the engine. It has been found that in many instances it is desirable to reduce the horsepower when the engine is connected to a low speed ratio through a transmission to conserve fuel and to protect the power train. In addition, it is also desirable to reduce the engine horsepower when the engine starts to overheat. The reduction of the horsepower, when an engine starts to overheat, is dependent upon the care which a given operator utilizes in watching the condition of the engine. In certain instances, an operator pays little attention to the temperature of the engine and will continue to operate the engine at maximum horespower even though the engine is overheating. The continued use of an overheated engine results in damage to the engine.

The prior art discloses the utilization of devices for controlling the rate of delivery of fuel to an engine. A typical prior art device is disclosed in U.S. Pat. No. 3,107,483, issued Oct. 22, 1963 to W. L. Hamilton and entitled "Fuel Control for Engines". Another system for limiting the torque of an engine is taught in U.S. Pat. No. 3,914,149 to Sale et al, issued Oct. 21, 1975 and entitled "Torque Limiting System and Method".

Although the prior art recognizes the desirability of limiting the torque in certain instances, the prior art does not teach a system which utilizes a horsepower limitation of an internal combustion engine, when the engine is overheated or when the equipment is operating at a low speed gear ratio. It is a principle object of this invention to provide a simple and economical system which automatically protects an internal combustion engine when the engine is overheating or when a transmission connected to the engine is in a low gear.

SUMMARY OF THE INVENTION

The present invention relates to an improved system for use with an internal combustion engine, which engine is connected to a load through a variable speed transmission. A fuel valve is connected to a source of fuel for affecting the rate of fuel delivered to the internal combustion engine in order to limit selectively the output power of the engine. A temperature responsive control is connected to a portion of the engine to determine the temperature of the engine. The temperature responsive control is also connected to the fuel valve to affect the fuel valve to regulate the rate of fuel delivered to the engine when the temperature of the engine is in a selected range. A speed responsive control is connected to a portion of the power train connected to the output of the engine. The speed responsive control is connected to the fuel valve in series with the temperature responsive control to affect the fuel valve for regulating the rate of fuel delivered to the engine.

DESCRIPTION OF THE PREFERRED EMBODIMENT

Figure 1:
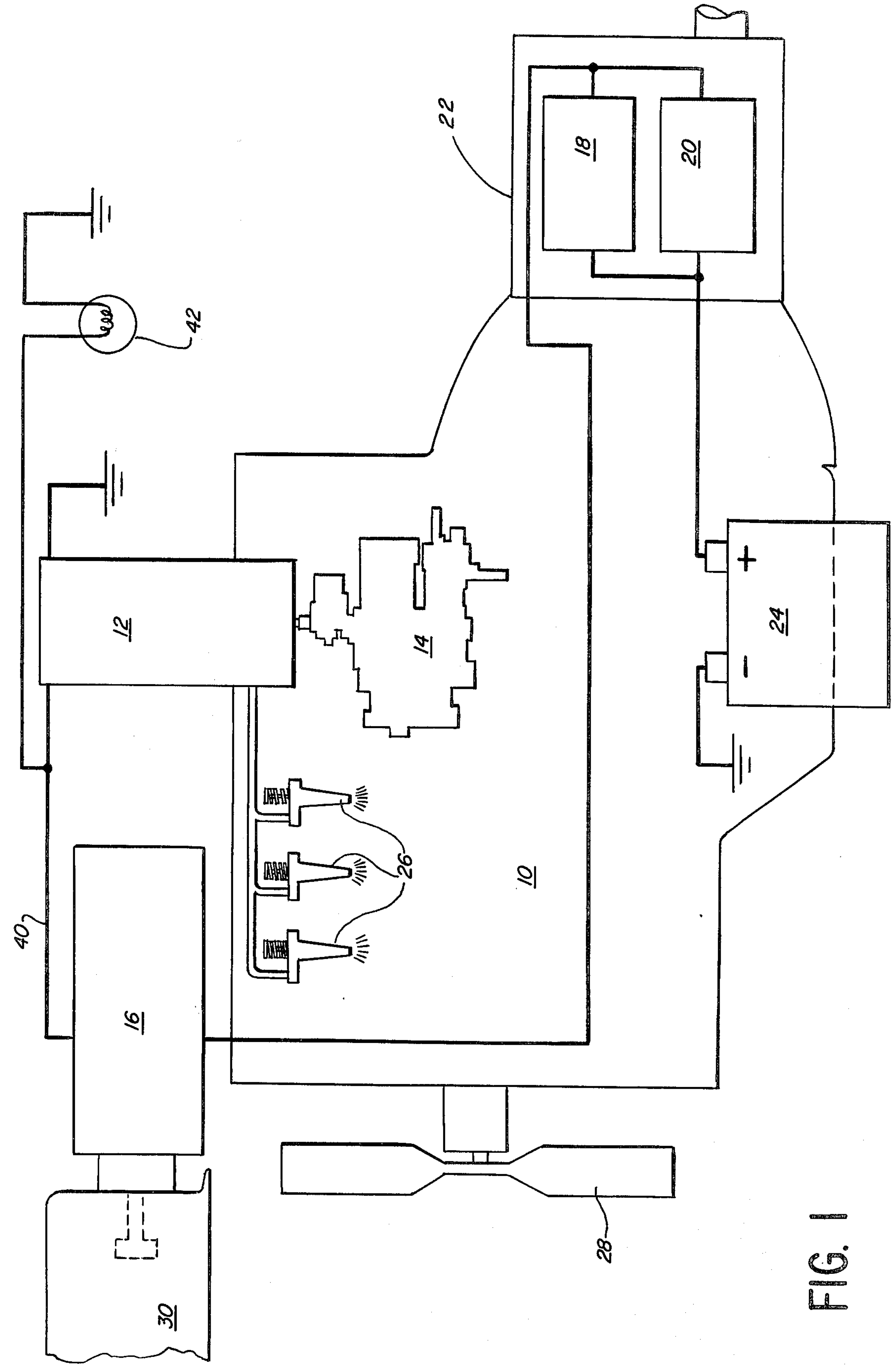
FIG. 1 is a general schematic view of the instant control system showing the operating relationship of the various parts in relation to an internal combustion engine.

Referring now to the drawings and especially to FIG. 1, an engine 10 is shown therein with a fuel valve 12 connected to a fuel pump 14, which is part of engine 10. Fuel valve 12 is connected to a temperature responsive control 16, which is electrically connected to a speed responsive control 18 and a speed responsive control 20. Speed responsive controls 18 and 20 are in turn connected to a transmission 22 of the engine. A storage battery 24 is electrically connected to the speed responsive controls, the temperature responsive control and the fuel valve.

The internal combustion engine 10 is a conventional diesel engine having a plurality of injectors 26 for delivering fuel to the engine as required to operate the engine. The injectors are connected to a fuel supply through fuel pump 14 and through fuel valve 12. The engine includes a conventional fan 28 and a conventional radiator 30 mounted adjacent to the fan. The radiator 30 contains a conventional coolant which is circulated through the engine.

The temperature responsive control 16 is a conventional and well-known thermal responsive switch, which has a portion mounted in radiator 30 to sense the temperature of the coolant and thereby, sense the engine temperature. The other portion of the control is a switch which has one side of the switch electrically connected to a lead 32, which lead 32 is electrically connected to the speed responsive controls 18 and 20. Speed responsive control 18 is connected to a second clutch to respond to the pressure generated in the clutch and to close a switch 34 when the clutch is in operation. The speed responsive control 20 also includes a switch 36, which control is connected to a third clutch to close switch 36 when the third clutch is in operation. Both switches 34 and 36 are electrically connected to lead 38 which is in turn electrically connected to battery 24.

The other side of the other portion of control 16 is electrically connected to a lead 40 which is connected electrically to an indicator lamp 42 and to fuel valve 12. Fuel valve 12 is conventional and includes a solenoid 44, which controls a dual position valve body 46. Valve body 46 contains an aperture 48. The valve body is movable in a base 50, which base includes an inlet 52 connected to fuel pump 14, and an outlet 54, which is connected to injectors 26.

Figure 3:
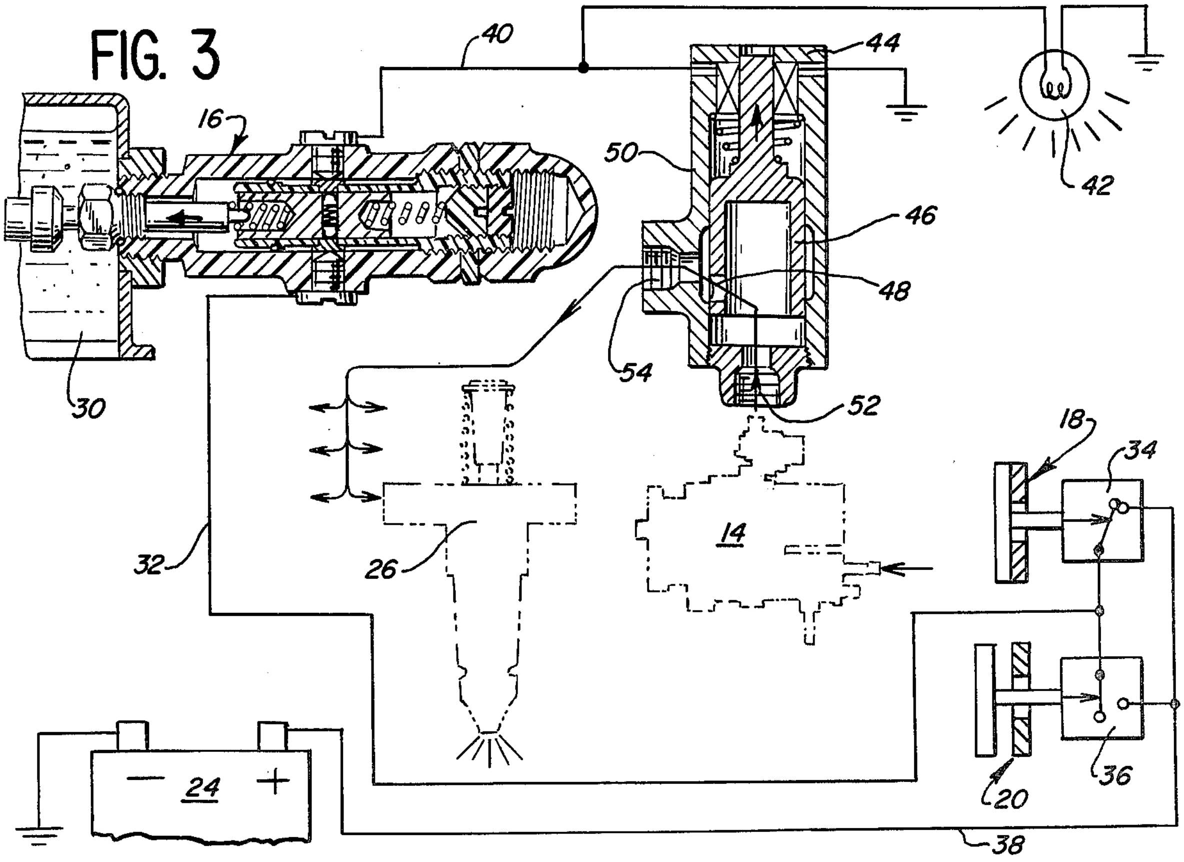
FIG. 3 is a diagramatic view of the control system similar to FIG. 2, but showing the system in an attitude to provide the maximum rate of delivery of fuel to the injectors of the engine.

The operation of the present device is not complex. When the temperature of the coolant is below a selected level, generally, slightly below the boiling temperature of the coolant, the temperature responsive control 16 is in the attitude shown in FIG. 3, in that the circuit through the control is completed. When the operator shifts the transmission into second gear or into third gear the appropriate speed responsive control is activated. FIG. 3 shows the second clutch operated to close switch 34. Thus, when the switch 34 is closed, which switch 34 is in series with the temperature responsive control 16, there is a complete circuit from the battery to solenoid 46. Valve body 46 is moved to allow aperture 48 to become aligned with outlet 54 thereby, allowing additional fuel to be delivered to the injectors. This means that the operator has maximum horsepower available from the engine in view of the fact that the maximum rate of fuel is delivered to the engine.

Figure 2:
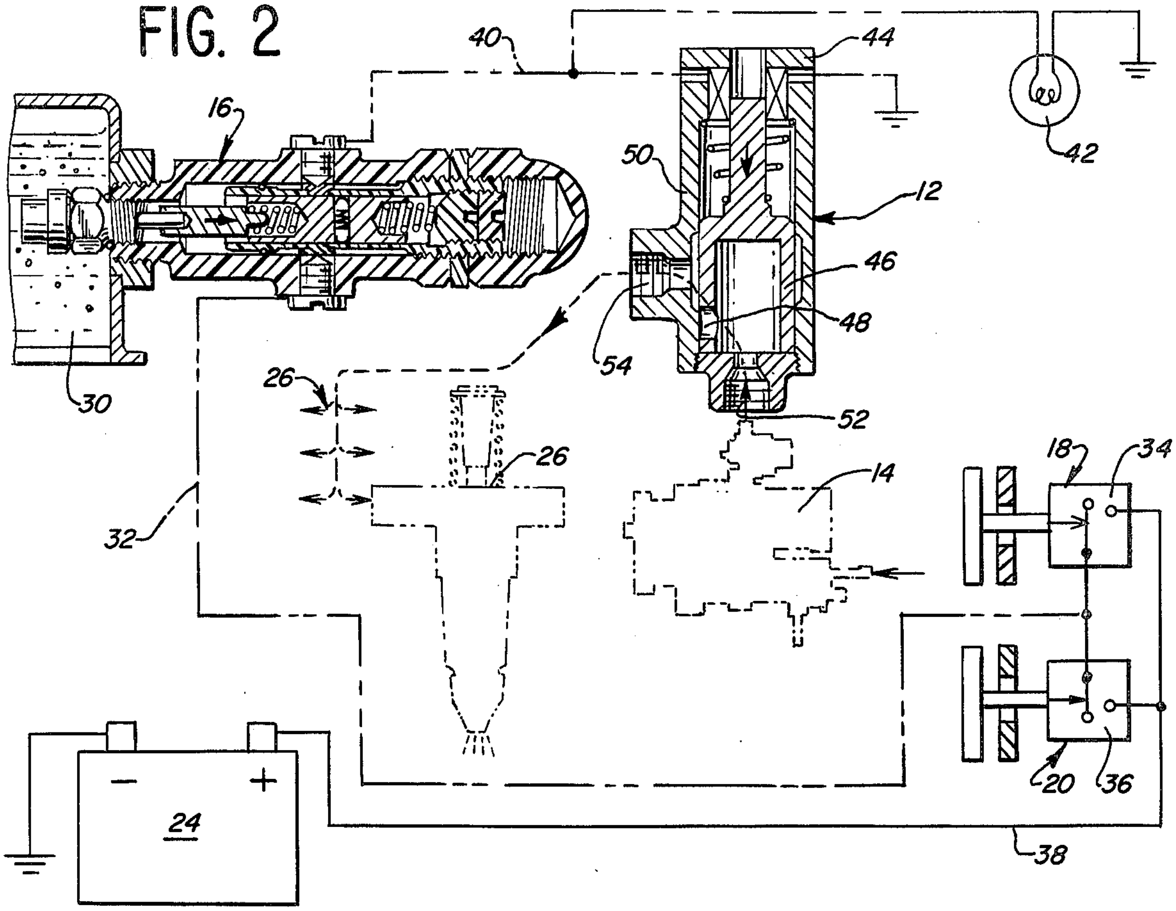
FIG. 2 is a diagrammatic representation of a portion of the control system of FIG. 1, showing the system in an attitude wherein a fuel valve is in a posture to limit the rate of fuel delivered to injectors of the internal combustion engine.

With the system in the attitude shown in FIG. 3, the engine is operating at the maximum horsepower. Should the engine become overheated or approach being overheated, the temperature responsive control then interrupts the circuit to the solenoid and the fuel valve assumes the attitude shown in FIG. 2, so that a lesser amount of fuel is delivered to the injectors. The operator need not observe the temperature gauge. The horsepower is automatically reduced when the coolant temperature exceeds its selected range. Thus, the engine is protected even though the operator does not note the temperature of the coolant.

It should be further noted that the engine delivers its maximum horsepower only when the second or third clutch is operated. Even though the engine coolant is not overheated, when the transmission is in first gear, the circuit to the solenoid is open so that the fuel valve is in the minimum delivery attitude. Thus, the amount of power delivered to the transmission is minimized when the transmission is in first gear to protect the power train and conserve fuel.

It may be readily appreciated that in the event that there are more than three gears, it would be possible to add additional normally open switches for each of the clutches. It is also possible to utilize only one switch by utilizing a normally closed switch with the first gear clutch. Thus, when the transmission goes into first and the first gear clutch is activated, the switch is opened and thereby, a minimum amount of power is delivered; wherein, when the first gear clutch is deactivated, the switch is closed and maximum power would be available if the engine were not overheated.

Although a specific embodiment of the herein disclosed invention has been shown in the accompanying drawings and disclosed in detail above, it is readily apparent that those skilled in the art may make various modifications and changes without departing from the spirit and scope of the present invention. It is to be expressly understood that the instant invention is limited only by the appended claims.

What is claimed is:

1. A system for controlling horsepower of an internal combustion engine having means for circulating coolant therethrough and a variable speed transmission connected to a work load comprising temperature sensitive means disposed in a portion of said means for circulating coolant responsive to changes in temperature of the engine coolant, pump means providing a source of fuel for said engine, fuel valve means receiving fuel from said pump means adaptable to selectively supply fuel to said engine in accordance with the requirements of said work load, speed sensitive means disposed in said transmission responsive to changes therein due to fluctuations of the work load, a source of electrical power for supplying current to said speed sensitive means, said speed sensitive means being electrically connected in series to said temperature sensitive means and said fuel valve means, said fuel valve means being effective upon receiving a signal from said speed sensitive means to increase the supply of fuel to said engine when said transmission is shifted from a lower to a higher speed range and thereby increase horsepower output of the engine.

2. The system of claim 1 wherein said temperature sensitive means is effective to interrupt the signal from said speed sensitive means to said fuel valve means and thereby reduce horsepower output of the engine.

3. The system of claim 1 wherein said speed sensitive means is connected to a plurality of clutches of said transmission.

4. The system of claim 1 comprising indicator means electrically connected between said temperature sensitive means and said fuel valve means for activation during maximum horsepower output of the engine.

5. The system of claim 1 wherein said fuel valve means is a two position valve having a higher rate of flow in a first position and a lower rate of flow in a second position, said higher rate of flow of said first position being effective to produce maximum horsepower output of the engine.

6. The system of claim 1 wherein said speed sensitive means is connected to a plurality of clutches of said transmission, and said fuel valve means is a two position valve haviong a higher rate of flow in a first position and a lower rate of flow in a second position, said higher rate of flow of said first position being effective to produce maximum horsepower output of the engine.

7. The system of claim 1 wherein said fuel valve means is a double acting solenoid valve.

8. The system of claim 1 wherein said transmission includes a plurality of clutches, one of which being effective to moderate the output of said fuel valve means and thereby reduce horsepower output of the engine.

9. The system of claim 2 wherein said speed sensitive means is connected to a plurality of clutches of said transmission.

10. The system of claim 1 wherein said speed sensitive means is responsive to pressure generated in a plurality of clutches of said transmission.

11. A system for controlling horsepower of an internal combustion engine having a variable speed transmission connected to a work load comprising a two position fuel valve connected to a source of fuel for controlling the maximum amount of fuel delivered to the internal combustion engine to determine the power output of the engine, a temperature sensitive control disposed in a radiator of the internal combustion engine for determining the temperature of a coolant in the radiator, said temperature sensitive control being electrically connected to the fuel valve, said temperature sensitive control being responsive to a predetermined temperature for electrically connecting the valve to an electrical source of power, and a speed sensitive control connected to a plurality of clutches of said transmission, said speed sensitive control being electrically connected to the fuel valve in series with the temperature sensitive control, whereby the temperature of the coolant in the engine and the utilization of at least one of said plurality of clutches combine to adjust the position of the fuel valve so that maximum horsepower output of the internal combustion engine is achieved.

* * * * *